United States Patent
Katanoda

(10) Patent No.: US 10,464,432 B2
(45) Date of Patent: Nov. 5, 2019

(54) VEHICLE AND CONTACTLESS POWER TRANSFER SYSTEM

(71) Applicant: TOYOTA JIDOSHA KABUSHIKI KAISHA, Toyota-shi, Aichi-ken (JP)

(72) Inventor: Tomoya Katanoda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 15/372,864

(22) Filed: Dec. 8, 2016

(65) Prior Publication Data

US 2017/0166072 A1 Jun. 15, 2017

(30) Foreign Application Priority Data

Dec. 15, 2015 (JP) .................. 2015/244356

(51) Int. Cl.
*H02J 50/90* (2016.01)
*B60L 11/18* (2006.01)
(Continued)

(52) U.S. Cl.
CPC .......... *B60L 11/1829* (2013.01); *B60L 53/12* (2019.02); *B60L 53/36* (2019.02); *B60L 53/38* (2019.02); *B60L 53/60* (2019.02); *H02J 7/025* (2013.01); *H02J 7/041* (2013.01); *H02J 50/12* (2016.02); *H02J 50/90* (2016.02); *B60L 2240/80* (2013.01); *Y02T 10/7005* (2013.01); *Y02T 10/7072* (2013.01); *Y02T 90/121* (2013.01); *Y02T 90/122* (2013.01); *Y02T 90/125* (2013.01);
(Continued)

(58) Field of Classification Search
None
See application file for complete search history.

(56) References Cited

U.S. PATENT DOCUMENTS

2010/0164439 A1* 7/2010 Ido ..................... B60W 10/26
320/155
2010/0280700 A1* 11/2010 Morgal ................. G06Q 10/02
701/31.4
(Continued)

FOREIGN PATENT DOCUMENTS

| CN | 105142958 A | 12/2015 |
|---|---|---|
| JP | 2010-288317 A | 12/2010 |

(Continued)

*Primary Examiner* — Nicholas K Wiltey
(74) *Attorney, Agent, or Firm* — Oliff PLC

(57) ABSTRACT

A vehicle includes a power receiving device, a power storage device, and an electronic control unit. A power receiving unit is configured to contactlessly receive electric power from a power transmitting unit of a power transmission device located outside the vehicle. The electronic control unit configured to set a charge start time at which the power storage device starts being charged, and start charging the power storage device with electric power received by the power receiving device irrespective of the charge start time, when the vehicle starts moving before the charge start time, from the condition where the position of the power receiving unit is adjusted relative to the power transmitting unit, and the vehicle is brought back into the condition where the position of the power receiving unit is adjusted relative to the power transmitting unit, within a predetermined time subsequent to start of movement of the vehicle.

8 Claims, 8 Drawing Sheets

(51) Int. Cl.
*H02J 50/12* (2016.01)
*H02J 7/02* (2016.01)
*H02J 7/04* (2006.01)
*B60L 53/12* (2019.01)
*B60L 53/38* (2019.01)
*B60L 53/36* (2019.01)
*B60L 53/60* (2019.01)

(52) U.S. Cl.
CPC .............. *Y02T 90/128* (2013.01); *Y02T 90/14* (2013.01); *Y02T 90/163* (2013.01)

(56) References Cited

U.S. PATENT DOCUMENTS

| | | | |
|---|---|---|---|
| 2011/0254503 A1* | 10/2011 | Widmer | B60L 11/182 320/108 |
| 2012/0074903 A1 | 3/2012 | Nakashima | |
| 2012/0161692 A1* | 6/2012 | Kobayashi | B60L 58/13 320/101 |
| 2013/0038715 A1* | 2/2013 | Ichikawa | B60K 6/445 348/118 |
| 2013/0127409 A1 | 5/2013 | Ichikawa | |
| 2013/0193749 A1 | 8/2013 | Nakamura et al. | |
| 2015/0008877 A1 | 1/2015 | Ichikawa et al. | |
| 2015/0046200 A1* | 2/2015 | Chihara | G06Q 10/02 705/5 |
| 2015/0375633 A1* | 12/2015 | Masuda | B60L 50/66 320/109 |
| 2016/0001667 A1* | 1/2016 | Masuda | B60L 53/305 320/109 |
| 2016/0001669 A1 | 1/2016 | Ichikawa | |
| 2016/0016480 A1* | 1/2016 | Kim | B60L 11/1846 701/22 |
| 2016/0028262 A1* | 1/2016 | Lee | H01R 13/447 320/155 |

FOREIGN PATENT DOCUMENTS

| | | |
|---|---|---|
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |

* cited by examiner

FIG. 5

<WEEKLY TIMER SETTING>

| DAY OF WEEK | SCHEDULED DEPARTURE TIME |
|---|---|
| MONDAY | AM 6:00 |
| TUESDAY | AM 7:00 |
| WEDNESDAY | AM 8:00 |
| THURSDAY | AM 7:00 |
| FRIDAY | AM 7:00 |
| SATURDAY | AM 9:00 |
| SUNDAY | AM 10:00 |

VEHICLE AND CONTACTLESS POWER TRANSFER SYSTEM

INCORPORATION BY REFERENCE

The disclosure of Japanese Patent Application No. 2015-244356 filed on Dec. 15, 2015 including the specification, drawings and abstract is incorporated herein by reference in its entirety.

BACKGROUND

1. Technical Field

The present disclosure relates to a vehicle and a contactless power transfer system, and in particular to a vehicle on which a power receiving device that contactlessly receives electric power from a power transmission device located outside the vehicle is installed, and a contactless power transfer system that contactlessly transfers electric power from the power transmission device to the power receiving device.

2. Description of Related Art

Power transfer systems each configured to contactlessly or wirelessly transfer electric power from a power transmission device located outside a vehicle to a power receiving device installed on the vehicle are known (see, for example, Japanese Patent Application Publications No. 2013-154815 (JP 2013-154815 A), No. 2013-146154 (JP 2013-146154 A), No. 2013-146148 (JP 2013-146148 A), No. 2013-110822 (JP 2013-110822 A), and No. 2013-126327 (JP 2013-126327 A)). For example, a contactless charging system in which a power receiving unit is provided on a bottom surface of the vehicle body, and a vehicle-mounted battery is charged with electric power contactlessly transmitted from a power transmitting unit installed on the ground, to the power receiving unit, is disclosed in JP 2013-154815 A.

In an electric vehicle described in Japanese Patent Application Publication No. 2010-288317 (JP 2010-288317 A), contact charging is conducted, namely, a vehicle-mounted battery is charged with a charge plug provided at an end portion of a charge cable inserted in an inlet of the vehicle. In this electric vehicle, so-called timer-controlled charge can be implemented, such that charge is started after a lapse of a predetermined time from insertion of the charge plug into the inlet (see JP 2010-288317 A).

SUMMARY

In a contactless charging system that charges a battery with electric power contactlessly transferred from a power transmission device to a power receiving device, too, it has been proposed to implement timer-controlled charge, as in the case of the contact charging system as described in JP 2010-288317 A. In the system that performs the timer-controlled charge, the vehicle is placed in a charge standby state, until the charge start time that complies with the time schedule of the timer-controlled charge comes. During a charge standby period of timer-controlled charge, if a trouble or problem occurs to an input device that enables the user to cancel or change setting of timer-controlled charge, for example, the user cannot cancel setting of timer-controlled charge. This may result in a situation where, even if the user wishes to immediately start charging, the charge cannot be started until the charge start time that complies with the time schedule of timer-controlled charge comes.

The present disclosure provides a vehicle on which a power receiving device that contactlessly receives electric power from a power transmission device located outside the vehicle is installed, and a contactless power transfer system, wherein charge can be started in compliance with the user's wishes, even if a trouble or problem occurs to an input device, or the like, capable of canceling or changing setting of timer-controlled charge.

A vehicle according to a first aspect of the present disclosure includes a power receiving device, a power storage device, and an electronic control unit. The power receiving device includes a power receiving unit. The power receiving unit is configured to contactlessly receive electric power from a power transmitting unit of a power transmission device located outside the vehicle. The power storage device is configured to store electric power received by the power receiving device. The electronic control unit is configured to: i) set a charge start time at which the power storage device starts being charged; ii) start charging the power storage device with electric power received by the electric power receiving device from the charge start time, when the vehicle is kept stopped in a condition where a position of the power receiving unit is adjusted relative to the power transmitting unit, until the charge start time comes; and iii) start charging the power storage device with electric power received by the power receiving device irrespective of the charge start time, when the vehicle starts moving before the charge start time, from the condition where the position of the power receiving unit is adjusted relative to the power transmitting unit, and the vehicle is brought back into the condition where the position of the power receiving unit is adjusted relative to the power transmitting unit, within a predetermined time subsequent to start of movement of the vehicle.

A contactless power transfer system according to a second aspect of the present disclosure includes a vehicle and a power transmission device. The vehicle includes a power receiving device, a power storage device, and an electronic control unit. The power receiving device includes a power receiving unit. The power storage device is configured to store electric power received by the power receiving device. The power transmission device is located outside the vehicle. The power transmission device includes a power transmitting unit. The power transmitting unit is configured to contactlessly transmit electric power to the power receiving unit of the power receiving device installed on the vehicle. The power receiving unit of the power receiving device is configured to contactlessly receive electric power from the power transmission device located outside the vehicle. The electronic control unit is configured to: i) set a charge start time at which the power storage device starts being charged; ii) start charging the power storage device with electric power received by the power receiving device from the charge start time, when the vehicle is kept stopped in a condition where a position of the power receiving unit is adjusted relative to the power transmitting unit, until the charge start time comes; and iii) start charging the power storage device with electric power received by the power receiving device irrespective of the charge start time, when the vehicle starts moving before the charge start time, from the condition where the position of the power receiving unit is adjusted relative to the power transmitting unit, and the vehicle is brought back into the condition where the position of the power receiving unit is adjusted relative to the power transmitting unit, within a predetermined time subsequent to start of movement of the vehicle.

According to the first and second aspects of the present disclosure, even if any trouble or problem occurs to an input device that enables the user to cancel or change setting of the charge start time of timer-controlled charge, during a charge standby period of timer-controlled charge for which the charge start time is set, it is possible to immediately start charge of the power storage device by means of the power transmission device, irrespective of setting of the charge start time (even if the charge start time is set), by executing the vehicle movement as described above within the predetermined time. Thus, according to the present disclosure, charge can be started in compliance with the user's wishes, even if a trouble or problem occurs to the input device, or the like, capable of cancelling or changing the charge start time.

The charge start time can be set based on at least one of the charge start time and the charge ending time, which are set as the time schedule. When only the charge ending time is set, the charge start time can be set, in view of the time required for charge of the power storage device, electricity cost at the time of charge, waiting time before departure in a fully charged state, and so forth.

Also, the above-indicated predetermined time is a length of time based on which the situation where the user wishes to start charge of the power storage device by means of the power transmission device irrespective of setting of the time schedule can be distinguished from the normal use of the vehicle. The predetermined time is set to a sufficiently shorter time than the time it normally takes from the start of use of the vehicle to the time when the user then comes home, and may be set to a level of several minutes, for example.

In the vehicle according to the first aspect of the present disclosure and the contactless power transfer system according to the second aspect of the present disclosure, the electronic control unit may be configured to determine the condition where the position of the power receiving unit is adjusted relative to the power transmitting unit, based on a condition where an efficiency of electric power transmission between the power transmitting unit and the power receiving unit is equal to or higher than a predetermined value when electric power that is equal to or smaller than a predetermined power is transmitted from the power transmitting unit.

With the vehicle and the contactless power transfer system configured according to the above aspects of the present disclosure, it is possible to start charge according to the user's wishes, even if a trouble or problem occurs to an input device, or the like, capable of cancelling or changing the charge start time.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 5 is a view showing an example of setting of the scheduled departure time of timer-controlled charge;

DETAILED DESCRIPTION OF EMBODIMENTS

Figure 1:
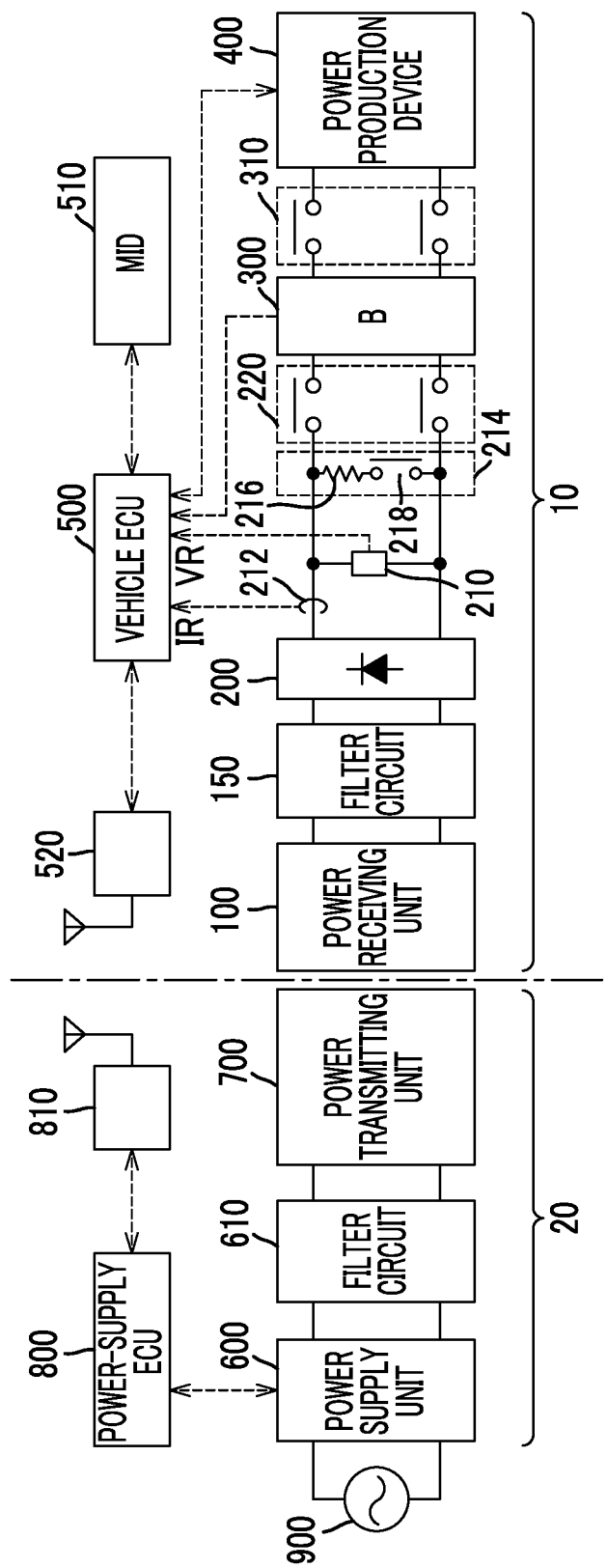
FIG. 1 is a view showing the overall configuration of a contactless power transfer system according to one embodiment of the present disclosure.

One embodiment of the present disclosure will be described in detail with reference to the drawings. In the drawings, the same reference numerals are assigned to the same or corresponding components or portions, of which explanation will not be repeated.

FIG. 1 shows the overall configuration of a contactless power transfer system according to one embodiment of the present disclosure. Referring to FIG. 1, the contactless power transfer system includes a vehicle 10, and a power transmission device 20. The power transmission device 20 is provided outside the vehicle 10, and is able to charge a power storage device 300 installed on the vehicle 10. In the following description, charge of the power storage device 300 of the vehicle 10 with electric power from the power transmission device 20 provided outside the vehicle will also be called "external charge".

The vehicle 10 includes a power receiving unit 100, filter circuit 150, rectifier circuit 200, power storage device 300, power production device 400, and relays 220, 310. The vehicle 10 further includes a voltage sensor 210, current sensor 212, circuit 214 for position adjustment, vehicle ECU (Electronic Control Unit) 500, MID (Multi-Information Display) 510, and a communication device 520.

The power receiving unit 100 contactlessly or wirelessly receives electric power (AC power) delivered from a power transmitting unit 700 (which will be described later) of the power transmission device 20, via a magnetic field. The power receiving unit 100 includes, for example, a resonance circuit for contactlessly receiving electric power from the power transmitting unit 700. While the resonance circuit normally includes a coil and a capacitor, the capacitor may not be provided if a desired resonant condition is formed solely by the coil. The power receiving unit 100 is provided in a lower part of the vehicle body closer to the front of the vehicle body, for example, and the power transmission device 20 is provided on the surface of the ground or in the ground.

The filter circuit 150, which is provided between the power receiving unit 100 and the rectifier circuit 200, suppresses or reduces higher harmonic noise generated when electric power is received by the power receiving unit 100. The filter circuit 150 is in the form of an LC circuit including an inductor and a capacitor. The rectifier circuit 200 rectifies AC power received by the power receiving unit 100, and delivers the resulting power to the power storage device 300. The rectifier circuit 200 includes a smoothing capacitor as well as a rectifier.

The power storage device 300 is a rechargeable DC power supply, and includes a secondary battery, such as a lithium-ion battery or a nickel hydride battery. The power storage device 300 stores electric power delivered from the rectifier circuit 200, and also stores electric power generated by the power production device 400. Then, the power storage device 300 supplies the stored electric power to the power production device 400. As the power storage device 300, an electric double layer capacitor, or the like may also be employed.

The power production device 400 generates driving force for running the vehicle 10, using electric power stored in the power storage device 300. Although not particularly illustrated in the drawings, the power production device 400 includes an inverter that receives electric power from the power storage device 300, a motor driven by the inverter, drive wheels driven by the motor, and so forth. The power production device 400 may include a generator that generates electric power with which the power storage device 300 is charged, and an engine capable of driving the generator.

The relay 220 is provided between the rectifier circuit 200 and the power storage device 300. The relay 220 is placed in the ON state (conduction state) during external charge. While the position of the power receiving unit 100 relative to the power transmitting unit 700 is adjusted prior to external charge, the relay 220 is placed in the OFF state (power shut-off state) during the position adjustment. SMR 310 is provided between the power storage device 300 and the power production device 400. The SMR 310 is placed in the ON state when start-up of the power production device 400 is requested.

The circuit 214 for position adjustment is provided between the rectifier circuit 200 and the relay 220. The circuit 214 for position adjustment includes a resistor 216 and a relay 218. The resistor 216 and the relay 218 are connected in series, between a pair of output lines of the rectifier circuit 200. The circuit 214 for position adjustment is used when the position of the power receiving unit 100 relative to the power transmitting unit 700 is adjusted, and the relay 218 is placed in the ON state (and the above-mentioned relay 220 is placed in the OFF state) during the position adjustment. In this condition, a given small power is delivered from the power transmitting unit 700 to the power receiving unit 100, and the position adjustment is carried out based on power receiving conditions (typically, received voltage) in the vehicle 10.

The voltage sensor 210 is provided on the output side of the rectifier circuit 200, to be located closer to the rectifier circuit 200 than the circuit 214 for position adjustment. The voltage sensor 210 detects voltage VR (corresponding to received voltage of the vehicle 10) indicating the output voltage of the rectifier circuit 200, and outputs the voltage VR to the vehicle ECU 500. The current sensor 212 detects current IR delivered from the rectifier circuit 200, and outputs the current IR to the vehicle ECU 500.

The MID 510 is a display device that displays various kinds of information on the vehicle 10, and also allows the user to perform input operation (i.e., the user can enter information or data via the MID 510). For example, the MID 510 includes a liquid crystal display that permits touch input, or an organic EL (electroluminescence) display, or the like. In the vehicle 10 according to this embodiment, an external charge start time is set according to a set time schedule, and timer-controlled charge can be carried out such that the charge is started at the external charge start time. The MID 510 is configured to enable the user to set the charge start time. More specifically, the MID 510 is configured such that the user can enter a scheduled time of departure of the vehicle 10, and the charge start time is set according to a time schedule set based on the scheduled departure time thus entered, so that timer-controlled charge is implemented.

Also, the MID 510 is configured to enable the user to cancel (including change) setting of the charge start time (setting of the timer-controlled charge).

The communication device 520 is configured to wirelessly communicate with a communication device 810 of the power transmission device 20. The communication device 520 sends and receives information, such as start/stop of electric power transmission, and power receiving conditions (e.g., received voltage) of the vehicle 10, to and from the communication device 810, during position adjustment and external charge.

The vehicle ECU 500 includes a CPU (Central Processing Unit), storage device, input/output buffer, and so forth (none of which is shown in the drawings). The vehicle ECU 500 receives signals from various sensors and outputs control signals to various devices, for control of various devices in the vehicle 10. For example, the vehicle ECU 500 performs traveling control of the vehicle 10, charge control at the time of external charge, and so forth.

In the vehicle 10 according to this embodiment, the vehicle ECU 500 performs control concerning position adjustment of the power receiving unit 100 relative to the power transmitting unit 700, control concerning timer-controlled charge, and control concerning operation to cancel setting of timer-controlled charge, as main controls performed by the vehicle ECU 500. These controls will be described in detail later.

On the other hand, the power transmission device 20 includes a power supply unit 600, filter circuit 610, power transmitting unit 700, power-supply ECU 800, and a communication device 810. The power supply unit 600 receives electric power from an external power supply 900, such as a commercial-system power supply, and generates AC power having a given transmission frequency. As one example, the power supply unit 600 includes a power factor correction (PFC) circuit, and an inverter that converts DC power received from the PFC circuit, into AC power having a given transmission frequency (e.g., several dozens of kHz).

The power transmitting unit 700 receives the AC power having the given transmission frequency, from the power supply unit 600, and contactlessly transmits the power to the power receiving unit 100 of the vehicle 10, via a magnetic field produced around the power transmitting unit 700. The power transmitting unit 700 includes, for example, a resonance circuit for contactlessly transmitting electric power to the power receiving unit 100. While the resonance circuit normally includes a coil and a capacitor, the capacitor may not be provided if a desired resonant condition is formed solely by the coil. For example, the power transmitting unit 700 is installed on the surface of the ground such that it can transmit electric power to the power receiving unit 100 provided in a lower part of the vehicle body.

The filter circuit 610 is provided between the power supply unit 600 and the power transmitting unit 700, and suppresses or reduces higher harmonic noise generated from the power supply unit 600. The filter circuit 610 is in the form of an LC circuit including an inductor and a capacitor, for example.

The power-supply ECU 800 includes a CPU, storage device, input/output buffer, etc. (none of which is shown in the drawings). The power-supply ECU 800 receives signals from various sensors, and outputs control signals to various devices, for control of various devices in the power transmission device 20. For example, the power-supply ECU 800 performs switching control of the power supply unit 600, so that the power supply unit 600 produces AC power having a given transmission frequency.

The communication device 810 is configured to wirelessly communicate with the communication device 520 of the vehicle 10. The communication device 810 sends and receives information, such as start/stop of electric power transmission, and power receiving conditions (such as received voltage) of the vehicle 10, to and from the communication device 520, during position adjustment and external charge.

In the power transmission device 20 of the contactless power transfer system as described above, AC power having a given transmission frequency is supplied from the power supply unit 600 to the power transmitting unit 700 via the filter circuit 610. Each of the power transmitting unit 700 and the power receiving unit 100 of the vehicle 10 includes a coil and a capacitor, and is designed to resonate at the transmission frequency.

If AC power is supplied from the power supply unit 600 to the power transmitting unit 700 via the filter circuit 610, energy (electric power) is transferred from the power transmitting unit 700 to the power receiving unit 100, via a magnetic field formed between a coil of the power transmitting unit 700 and a coil of the power receiving unit 100. Then, the energy (electric power) transferred to the power receiving unit 100 is supplied to the power storage device 300, via the filter circuit 150 and the rectifier circuit 200.

Figure 2:
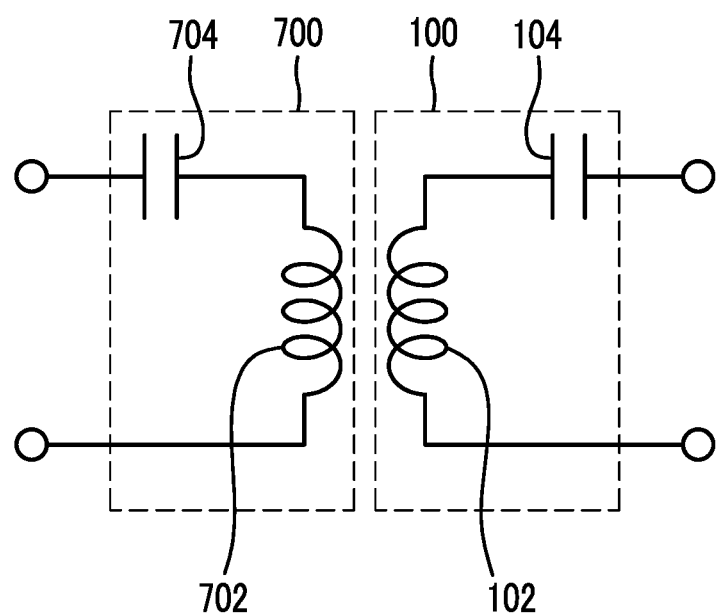
FIG. 2 is a view showing one example of circuit configuration of a power receiving unit and a power transmitting unit shown in FIG. 1.

FIG. 2 shows one example of circuit configuration of the power receiving unit 100 and power transmitting unit 700 shown in FIG. 1. Referring to FIG. 2, the power receiving unit 100 includes a coil 102 and a capacitor 104. The capacitor 104 is connected in series to the coil 102, and cooperates with the coil 102 to form a resonance circuit. The capacitor 104 is provided for adjusting the resonance frequency of the power receiving unit 100. The Q value indicating the resonance intensity of the resonance circuit constituted by the coil 102 and the capacitor 104 is preferably 100 or larger.

The power transmitting unit 700 includes a coil 702 and a capacitor 704. The capacitor 704 is connected in series to a coil 702, and cooperates with the coil 702 to form a resonance circuit. The capacitor 704 is provided for adjusting the resonance frequency of the power transmitting unit 700. The Q value of the resonance circuit constituted by the coil 702 and the capacitor 704 is also preferably 100 or larger.

In each of the power transmitting unit 700 and the power receiving unit 100, the capacitor may be connected in parallel with the coil. Also, when it is possible to achieve a desired resonance frequency without providing any capacitor, each of the power transmitting unit 700 and the power receiving unit 100 may not be provided with a capacitor.

Although not particularly illustrated in the drawings, the structure of the coils 102, 702 is not particularly limited. For example, a coil in a spiral form or a helical form, which is wound around an axis that extends along the vertical direction of the vehicle body, may be employed as the coil 102, and a coil in a spiral form or a helical form, which is wound around an axis that extends in a normal direction of the ground surface, may be employed as the coil 702. Alternatively, the coil 102 may be formed by winding an electric wire or cable around a ferrite plate that extends in the horizontal direction of the vehicle body, and the coil 702 may be formed by winding an electric wire or cable around a ferrite plate that extends along the ground surface.

Referring again to FIG. 1, in the vehicle 10 according to this embodiment, the vehicle ECU 500 performs control concerning position adjustment of the power receiving unit 100 relative to the power transmitting unit 700, control concerning timer-controlled charge, and control concerning operation to cancel setting of timer-controlled charge, as described above. Each of these controls will be described.
(Explanation of Control Concerning Position Adjustment)

The position of the power receiving unit 100 relative to the power transmitting unit 700 is adjusted, prior to charge (external charge) of the power storage device 300 by use of the power transmission device 20. The "position adjustment" means adjustment of the position of the power receiving unit 100 relative to the power transmitting unit 700 in the horizontal direction of the vehicle body. Once communications between the communication device 810 of the power transmission device 20 and the communication device 520 of the vehicle 10 are established, the vehicle ECU 500 places the relays 218, 220 in the ON state and the OFF state, respectively, and places the relay 310 in the ON state, so as to start position adjustment. In this condition, a given small electric power (power smaller than that for external charge) is delivered from the power transmitting unit 700 to the power receiving unit 100 (Low Power Excitation), and the position adjustment is carried out based on the efficiency of electric power transmission between the power transmitting unit 700 and the power receiving unit 100.

Figure 3:
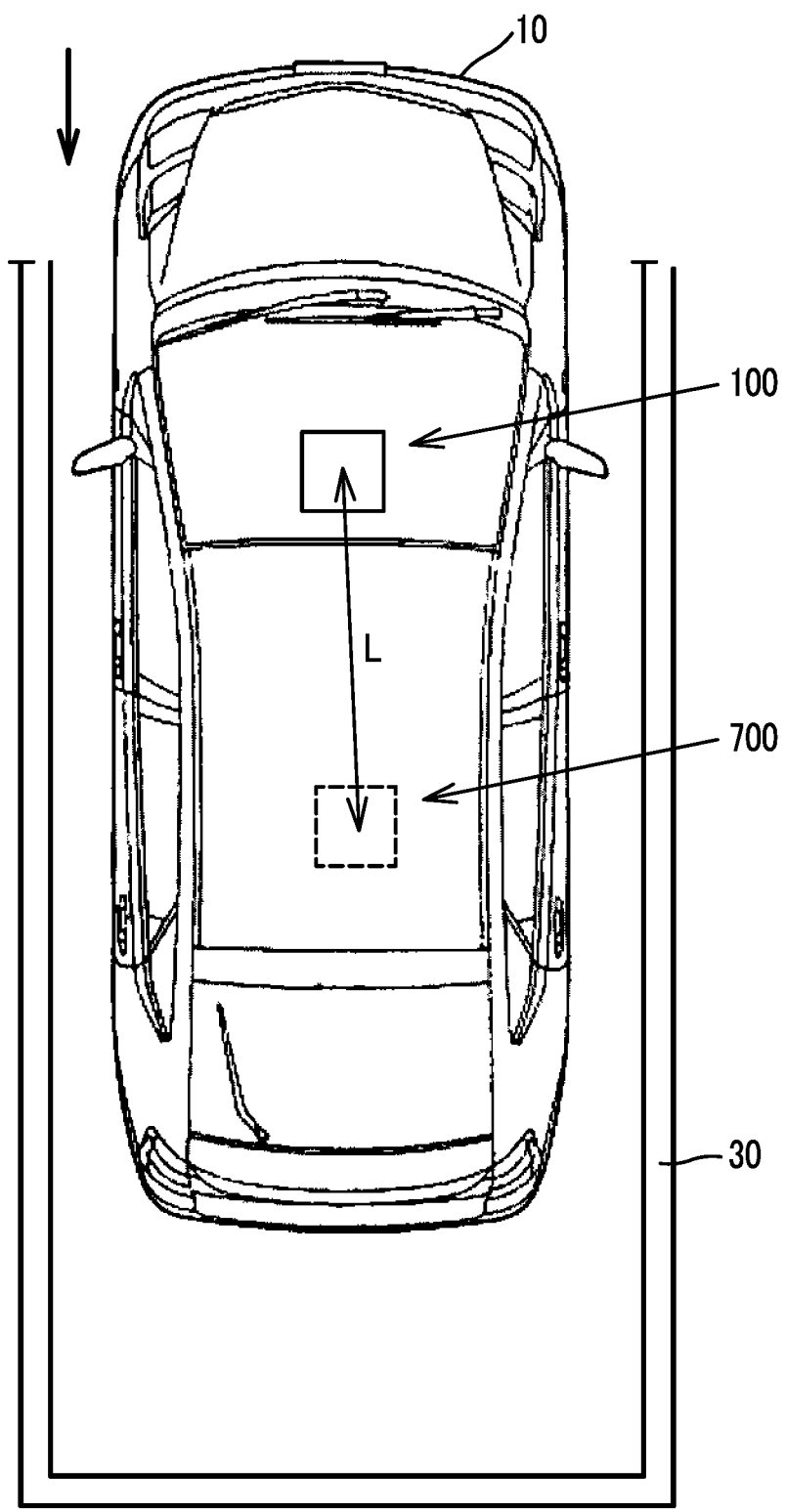
FIG. 3 is a view showing the positional relationship between the power transmitting unit and the power receiving unit, when the vehicle is seen from above.
Figure 4:
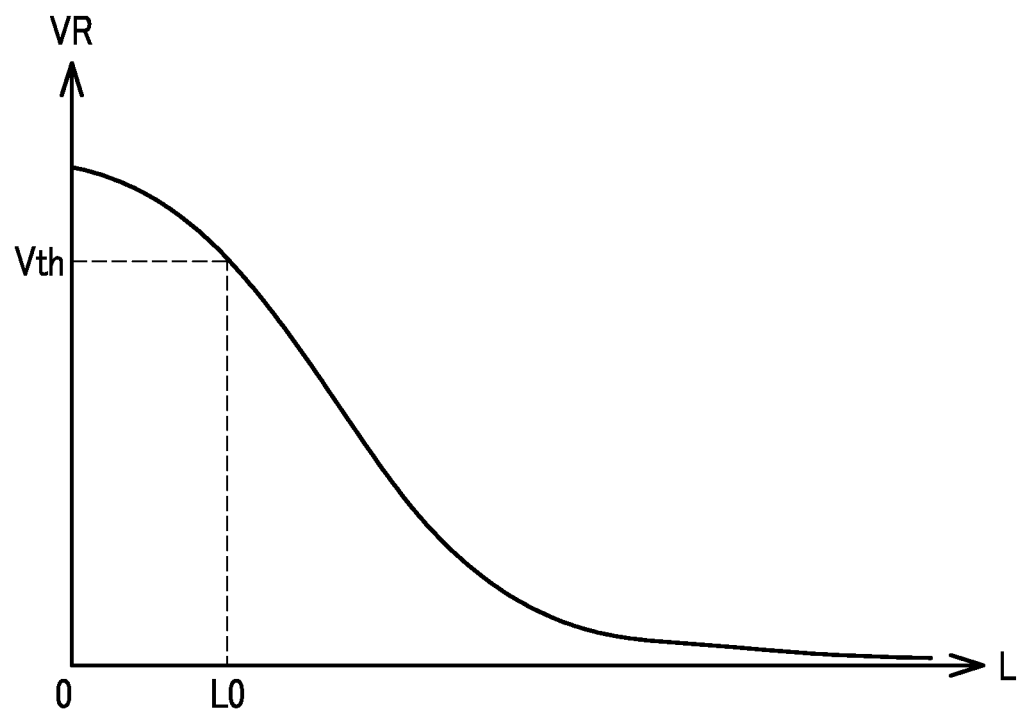
FIG. 4 is a view showing the relationship between the displacement amount of the power receiving unit relative to the power transmitting unit and the voltage of received power of the vehicle.

FIG. 3 and FIG. 4 are views useful for explaining one example of method of determining position adjustment. FIG. 3 shows the positional relationship between the power transmitting unit 700 and the power receiving unit 100, when the vehicle 10 is seen from above. Referring to FIG. 3, the power transmitting unit 700 of the power transmission device 20 is installed in a parking slot 30, and the vehicle 10 is parked along the parking slot 30 (i.e., in a longitudinal direction of the parking slot 30). While the vehicle 10 is backed up to park in this example, head-in parking may be performed. The distance between the power transmitting unit 700 and the power receiving unit 100 as measured in the ground horizontal direction (horizontal direction of the vehicle body) is denoted as "displacement amount L".

FIG. 4 shows the relationship between the displacement amount L of the power receiving unit 100 relative to the power transmitting unit 700 and the received voltage of the vehicle 10. Referring to FIG. 4, the horizontal axis indicates the displacement amount L, and the vertical axis indicates the voltage VR detected by the voltage sensor 210 (FIG. 1). The distance between the power transmitting unit 700 and the power receiving unit 100 as measured in a direction perpendicular to the ground (vertical direction of the vehicle body) is supposed to be constant. As described above, at the time of position adjustment, the relays 218, 220 (FIG. 1) are placed in the ON state and the OFF state, respectively, and a given small power is delivered from the power transmitting unit 700 to the power receiving unit 100. Accordingly, the voltage VR corresponds to the voltage of electric power received from the power transmitting unit 700, which voltage is not constrained by the voltage of the power storage device 300.

When the displacement amount L is large, the degree of magnetic coupling between the power receiving unit 100 and the power transmitting unit 700 is small, and the voltage VR detected by the voltage sensor 210 is low. As the displacement amount L decreases with movement of the vehicle 10, the degree of magnetic coupling between the power receiving unit 100 and the power transmitting unit 700 increases with decrease in the displacement amount L, and the voltage VR detected by the voltage sensor 210 increases. Then, if the voltage VR exceeds a predetermined threshold value Vth, it is determined that the efficiency of electric power transmission between the power transmitting unit 700 and the power receiving unit 100 is equal to or higher than a predetermined level. Further, if the user operates the shift lever so as to select that the parking (P) range, the vehicle ECU 500 determines that the position adjustment is completed.

While the case where the voltage VR detected by the voltage sensor 210 is used as a parameter for determining the efficiency of power transmission between the power transmitting unit 700 and the power receiving unit 100 has been typically described above, other parameters may be used. For example, the received electric power may be used in place of the voltage VR, or the power transmission efficiency itself may be calculated. The received power can be calculated by multiplying the voltage VR detected by the voltage sensor 210, by the current IR detected by the current sensor 212 (FIG. 1). Also, the power transmission efficiency can be calculated by obtaining the ratio of the magnitude of the received power of the vehicle 10, to the magnitude of the given small power delivered from the power transmitting unit 700.

(Explanation of Control Concerning Timer-Controlled Charge)

In the vehicle 10 according to this embodiment, after the adjustment of the position of the power receiving unit 100 relative to the power transmitting unit 700 is completed, timer-controlled charge is carried out by starting external charge at the charge start time that is set according to the set time schedule. In this embodiment, the vehicle ECU 500 sets the time schedule including the start time of external charge, based on the scheduled departure time entered and set by the user with the MID 510.

As one example, the vehicle ECU 500 sets a charge ending time having a given margin time with respect to the scheduled departure time, based on the scheduled departure time of the vehicle 10. Then, the vehicle ECU 500 sets the start time of external charge, in view of the length of time required for external charge, electricity cost at the time of external charge, waiting time before departure in a fully charged state, and so forth.

In the MID 510, the ending time of external charge may be directly set in the MID 510, and the start time of external charge may be set, in view of the above-mentioned various conditions, such as the time required for external charge. In another example, the start time of external charge may be directly set in the MID 510, and the external charge may be started when the set charge start time comes.

The vehicle ECU 500 incorporates a timer. When the charge start time that complies with the set time schedule comes, the vehicle ECU 500 places the relay 220 (FIG. 1) in the ON state (and places the relays 218, 310 in the OFF states), and sends a command for starting electric power transmission to the power transmission device 20 via the communication device 520. Once charging of the power storage device 300 is completed, the vehicle ECU 500 sends a command for stopping power transmission to the power transmission device 20 via the communication device 520, and places the relay 220 in the OFF state.

FIG. 5 is a view showing an example of setting of timer-controlled charge. Referring to FIG. 5, in the vehicle 10, the scheduled departure time can be set from the MID 510 for each day of the week (weekly timer setting), for enhanced convenience in timer-controlled charge setting by the user whose scheduled departure time can vary by day of the week. Namely, the user can set the scheduled departure time for each day of the week in the MID 510.

When the user drives the vehicle 10 home, and completes adjustment of the position of the power receiving unit 100 of the vehicle 10 relative to the power transmitting unit 700 of the power transmission device 20 installed in parking space, the vehicle ECU 500 checks the presence or absence of weekly timer setting in the MID 510. Then, if the weekly timer setting is done, the vehicle ECU 500 sets the start time of external charge, based on the scheduled departure time of the day of the week corresponding to the next day. Once the start time of external charge is set, the vehicle 10 is placed in a standby state until the charge start time comes. When the charge start time comes, a certain system associated with external charge is started so as to start the external charge.

(Explanation of Control Concerning Operation to Cancel Timer-Controlled Charge Setting)

In timer-controlled charge, the vehicle 10 is placed in a charge standby state, until the set charge start time comes. Even during the charge standby period of timer-controlled charge, if the user wishes to immediately start external charge, due to a change in the user's schedule of the next day, the vehicle 10 can get rid of the charge standby state, and the system can start external charge by cancelling setting of timer-controlled charge via the MID 510.

However, if a trouble or problem that disables entry of information via the MID 510 occurs, during the charge standby period of timer-controlled charge, for example, a situation where setting of the charge start time of timer-controlled charge cannot be cancelled via the MID 510 takes place. As a result, the following situation takes place; namely, even if the user wishes to immediately start external charge, external charge cannot be started until the charge start time of the timer-controlled charge comes.

In the case where the weekly timer setting as described above is established, in particular, once the user drives the vehicle home, and adjustment of the position of the power transmitting unit 700 relative to the power receiving unit 100 is completed, the vehicle can be automatically brought into the charge standby state for timer-controlled charge, without requiring the MID 510 to be operated. Accordingly, when the user, who wishes to immediately start external charge due to a change in the schedule of the next day, operates the MID 510 in an attempt to cancel setting of the charge start time of timer-controlled charge, setting of the charge start time of timer-controlled charge may not be cancelled, due to a trouble or failure of the MID 510, for example, and external charge may not be started until the charge start time of timer-controlled charge comes.

Thus, in the vehicle 10 according to this embodiment, if the charge start time of timer-controlled charge is set, and a certain operation to cancel setting of the charge start time of timer-controlled charge, which is not cancellation of setting of timer-controlled charge via the MID 510, is carried out, before the start time of external charge comes, the vehicle ECU 500 executes a process for starting external charge, irrespective of setting of the charge start time of timer-controlled charge.

Figure 6:
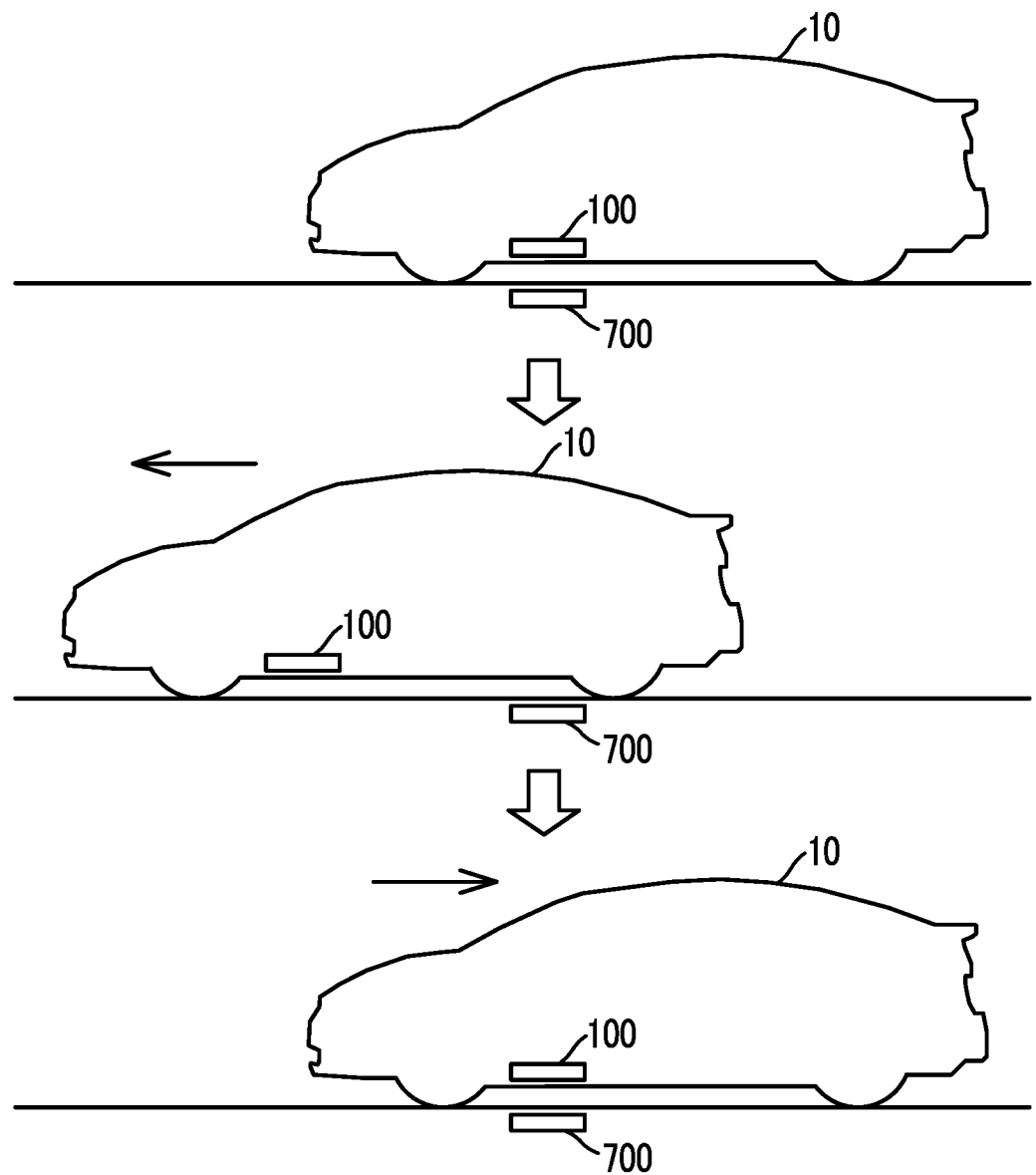
FIG. 6 is a view useful for explaining operation to cancel setting of the charge start time of timer-controlled charge through vehicle movement.

More specifically, if the charge start time of timer-controlled charge is set, and the vehicle 10 is moved from a condition where the power receiving unit 100 and the power transmitting unit 700 are aligned with each other, and then moved and brought back into the condition where these units 100, 700 are aligned with each other, within a predetermined time from the start of the initial movement of the vehicle 10, as shown in FIG. 6, before the start time of external charge comes, the vehicle ECU 500 executes the process for starting external charge, irrespective of setting of the charge start time of timer-controlled charge.

In the above manner, even if a trouble, such as a failure of entry or input via the MID 510, occurs, during the charge standby period before the charge start time of timer-controlled charge comes, the above-described vehicle movement is carried out within the predetermined time, so that external charge can be started irrespective of setting of the charge start time of timer-controlled charge (even if the charge start time of timer-controlled charge is set). Accordingly, with this embodiment, external charge can be started according to the user's wishes, even if a trouble, such as a failure to cancel setting of timer-controlled charge via the MID 510, occurs.

The above-indicated predetermined time is a length of time based on which the situation where the user wishes to start external charge irrespective of setting of the charge start time of timer-controlled charge can be distinguished from the normal use of the vehicle 10. The predetermined time is set to a sufficiently shorter time than the time it normally takes from the start of use of the vehicle 10 to the time when the user comes home, and may be set to a level of several minutes, for example.

The process for starting external charge includes a step in which the vehicle ECU 500 places the relay 220 (FIG. 1) in the ON state (and places the relays 218, 310 in the OFF states), and a step of sending a command for start of external charge to the power transmission device 20 via the communication device 52.

In FIG. 6, as the operation to cancel setting of the charge start time of timer-controlled charge through vehicle movement, the vehicle 10 is once moved forward from the condition where the power receiving unit 100 is aligned with the power transmitting unit 700, and then moved backward and brought back into the condition where the power receiving unit 100 and the power transmitting unit 700 are aligned with each other again. However, the direction of each movement of the vehicle 10 is not particularly limited. It is determined that the operation to cancel setting of timer-controlled charge through vehicle movement has been carried out, if the vehicle 10 is moved from the condition where the power receiving unit 100 and the power transmitting unit 700 are aligned with each other, and is then brought back into the aligned condition again within the predetermined time from the start of the initial movement.

Figure 7:
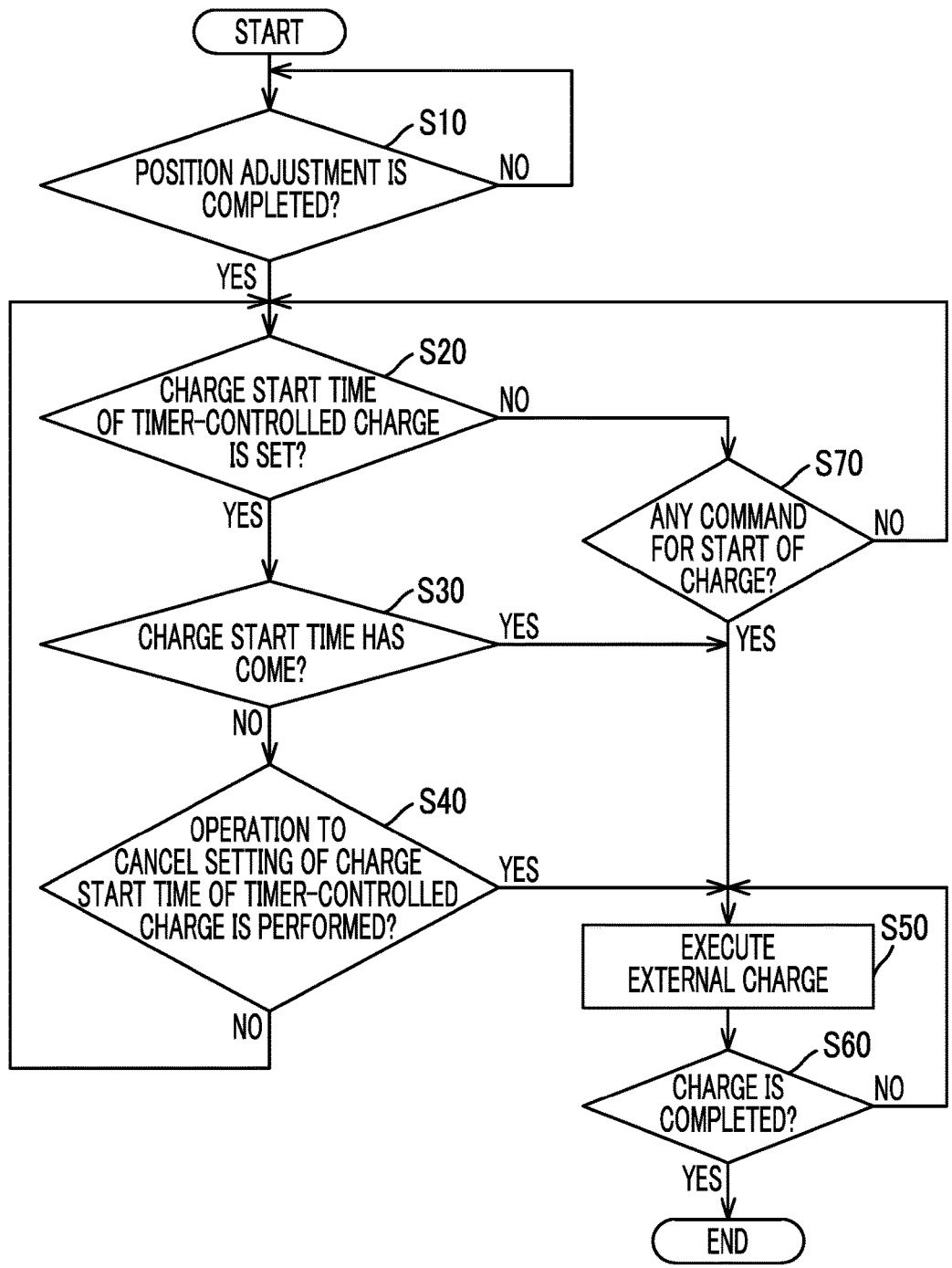
FIG. 7 is a flowchart illustrating the processing procedure of a vehicle ECU concerning the operation to cancel setting of the charge start time of timer-controlled charge through vehicle movement.

FIG. 7 is a flowchart illustrating a processing procedure of the vehicle ECU 500 concerning operation to cancel timer-controlled charge setting through vehicle movement. Referring to FIG. 7, the vehicle ECU 500 determines whether adjustment of the position of the power receiving unit 100 of the vehicle 10 relative to the power transmitting unit 700 of the power transmission device 20 is completed (step S10). It is determined that the position adjustment is completed, if the voltage VR detected by the voltage sensor 210 exceeds the threshold value Vth as shown in FIG. 4, for example, so that the efficiency of power transmission between the power transmitting unit 700 and the power receiving unit 100 is determined as being equal to or higher than a certain level, during execution of position adjustment by delivering a given small power from the power transmitting unit 700 to the power receiving unit 100, and, furthermore, the P range is selected through operation of the shift lever by the user.

If it is determined that the position adjustment is completed (YES in step S10), the vehicle ECU determines whether the charge start time of timer-controlled charge is set (step S20). More specifically, it is determined whether the scheduled departure time of the next day has been entered with the MID 510, and the charge start time of timer-controlled charge is set based on the scheduled departure time.

If it is determined in step S20 that the charge start time of timer-controlled charge is set (YES in step S20), the vehicle ECU 500 determines whether the start time of external charge as timer-controlled charge has come (step S30).

If it is determined in step S30 that the start time of external charge has not come (NO in step S30), the vehicle ECU 500 determines whether the prescribed operation to cancel setting of timer-controlled charge through vehicle movement, rather than using the MID 510, has been carried out (step S40).

Figure 8:
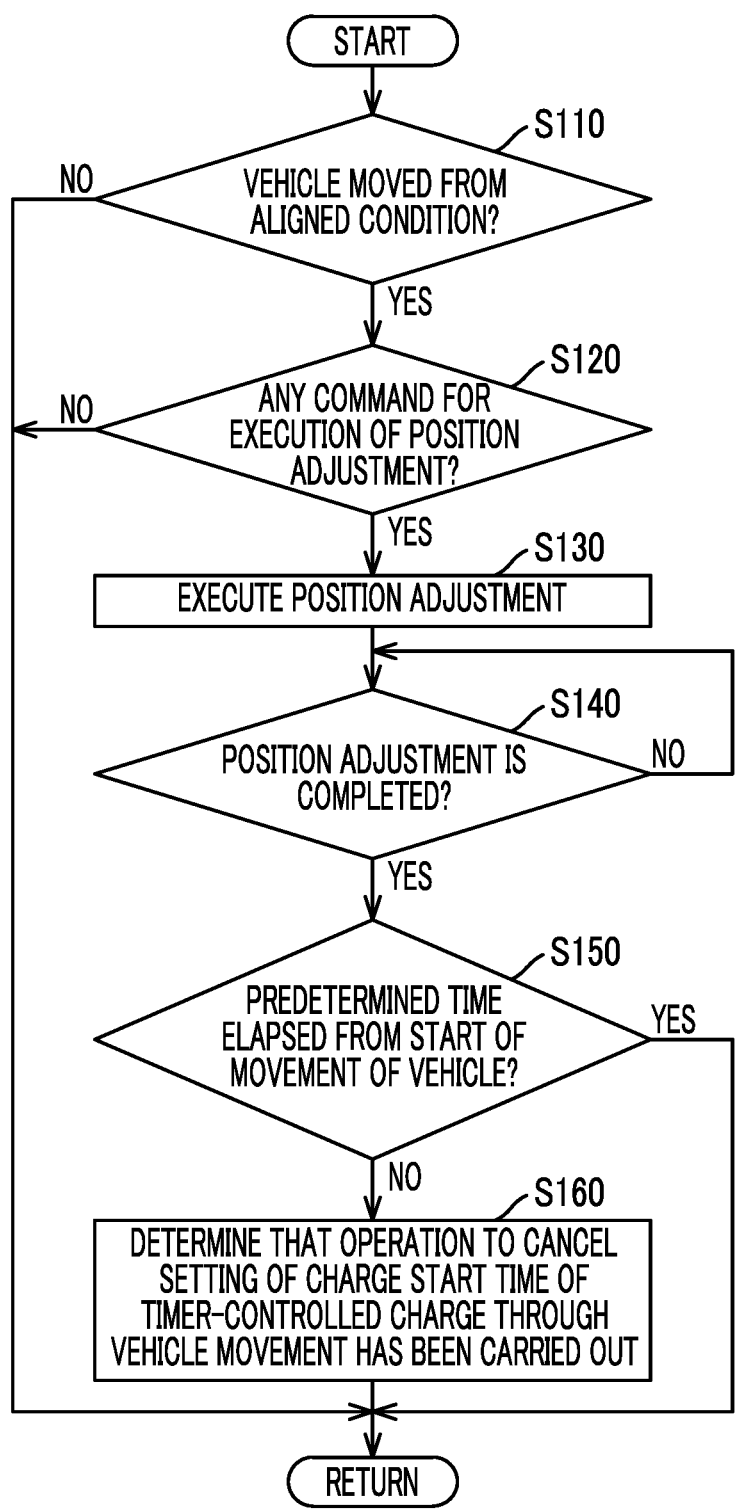
FIG. 8 is a flowchart illustrating the operation to cancel setting of the charge start time of timer-controlled charge through vehicle movement.

FIG. 8 is a flowchart illustrating the procedure of the operation to cancel setting of the charge start time of timer-controlled charge through vehicle movement. The control routine illustrated in this flowchart is executed separately from the control routine of the flowchart shown in FIG. 7, and is repeatedly executed at given time intervals.

Referring to FIG. 8, the vehicle ECU 500 determines whether the vehicle 10 has moved from a condition where the power receiving unit 100 is aligned with the power transmitting unit 700 of the power transmission device 20 (step S110). If it is determined that the vehicle 10 has not moved from the aligned condition (NO in step S110), the following steps are not executed, and the control returns.

If it is determined in step S110 that the vehicle 10 has moved from the aligned condition (YES in step S110), the vehicle ECU 500 determines whether a command for execution of position adjustment or alignment has been generated (step S120). For example, an external charge permission switch that can be operated by the user is provided, and it is determined that a command for execution of position adjustment is generated when the external charge permission switch is turned ON. If no command for execution of position adjustment is generated (NO in step S120), the following steps are not executed, and the control returns.

If it is determined in step S120 that a command for execution of position adjustment has been generated (YES in step S120), the vehicle ECU 500 performs adjustment of the position of the power receiving unit 100 relative to the power transmitting unit 700 (step S130). More specifically, the vehicle ECU 500 places the relays 218, 220 in the ON state and the OFF state, respectively, sends a command for output of small electric power for the purpose of position adjustment, to the power transmission device 20 via the communication device 520, so that the position adjustment is carried out based on the efficiency of power transmission between the power transmitting unit 700 and the power receiving unit 100.

In step S120, it may be determined that there is a command for execution of position adjustment, as long as the vehicle 10 does not move to such an extent that it becomes impossible for the communication device 520 of the vehicle 10 and the communication device 810 of the transmission device 20 to communicate with each other (for example, the vehicle 10 is spaced about several meters from the power transmission device 20), and may determine that there is no command for execution of position adjustment, if the vehicle 10 moves to such an extent that it becomes impossible for the communication device 520 and the communication device 810 to communicate with each other. In this case, the power transmission device 20 stops delivering small electric power since the communication devices 520, 810 fail to communicate with each other.

If the position adjustment is carried out in step S130, the vehicle ECU 500 determines whether the position adjustment is completed (step S140). As described above, it is determined that the position adjustment is completed, if the voltage VR of the voltage sensor 210 exceeds the threshold value Vth so that it is determined that the efficiency of power transmission between the power transmitting unit 700 and the power receiving unit 100 is equal to or higher than a certain level, and the P range is selected by the user.

Then, if it is determined that the position adjustment is completed (YES in step S140), the vehicle ECU 500 determines whether a predetermined time has elapsed from the time when the movement of the vehicle 10 in step S110 was started (step S150). As described above, the predetermined time is the length of time based on which the above-described vehicle movement performed by the user who wishes to start external charge irrespective of setting of the charge start time of timer-controlled charge is distinguished from the normal use of the vehicle 10.

Then, if it is determined in step S150 that the predetermined time has not elapsed (NO in step S150), the vehicle ECU 500 determines that the operation to cancel setting of the charge start time of timer-controlled charge through vehicle movement has been carried out (step S160). If it is determined in step S150 that the predetermined time has elapsed (YES in step S150), the vehicle movement is determined as normal use of the vehicle, and is determined as not being performed for cancelling setting of the charge start time of timer-controlled charge.

Referring again to FIG. 7, if it is determined in step S40 whether the operation to cancel setting of the charge start time of timer-controlled charge through vehicle movement (FIG. 8) is not carried out (NO in step S40), the vehicle ECU 500 returns to step S20, and determines the presence or absence of timer-controlled charge setting again. If no trouble occurs to the MID 510, and setting of the charge start time of timer-controlled charge is cancelled via the MID 510 before the start time of external charge according to the time schedule comes, a negative decision (NO) is obtained in step S20 of the following cycle.

If it is determined in step S40 that the operation to cancel setting of the charge start time of timer-controlled charge through vehicle movement (FIG. 8) has been carried out (YES in step S40), the vehicle ECU 500 cancels setting of the charge start time of timer-controlled charge, and executes a process for starting external charge. More specifically, the vehicle ECU 500 places the relay 220 (FIG. 1) in the ON state (and places the relays 218, 310 in the OFF states), and sends a command for start of electric power transmission, to the power transmission device 20 via the communication device 520. As a result, the external charge is carried out (step S50).

During execution of external charge, the vehicle ECU 500 determines whether the charge is completed (step S60). For example, it is determined that the charge is completed if the power storage device 300 reaches the fully charged state, or the amount of electric power with which the power storage device 300 is charged reaches a desired amount where the amount of power charged by external charge can be set. Then, if it is determined in step S60 that the charge is completed (YES in step S60), the external charge is stopped, and the routine of FIG. 7 ends.

If, on the other hand, it is determined in step S30 that the charge start time of timer-controlled charge has come (YES in step S30), the vehicle ECU 500 proceeds to step S50, and external charge is carried out.

Also, if it is determined in step S20 that the charge start time of timer-controlled charge is not set (NO in step S20), the vehicle ECU 500 determines whether there is a command for start of external charge (step S70). For example, an external charge permission switch that can be operated by the user may be provided, and it may be determined that a command for start of external charge is generated when the external charge permission switch is in the ON state. If it is determined that the command for start of external charge is generated (YES in step S70), the vehicle ECU 500 proceeds to step S50, and external charge is carried out. When there is no command for start of external charge (NO in step S70), the vehicle ECU 500 returns to step S20.

Although not particularly illustrated in the drawings, if the vehicle 10 starts traveling in a condition where the charge start time of timer-controlled charge is not set (NO in step S20), and there is no command for start of external charge (NO in step S70), the vehicle ECU 500 proceeds to "END".

Step S70 may be eliminated. Namely, when it is determined in step S20 that the charge start time of timer-controlled charge is not set, the vehicle ECU 500 may proceed to step S50, so that external charge is carried out.

As described above, in this embodiment, even if a trouble or problem occurs to the MID 510, or the like, which enables the user to cancel or change setting of the charge start time of timer-controlled charge, for example, during the charge standby period prior to the charge start time of timer-controlled charge, external charge can be started, irrespective of setting of the charge start time of timer-controlled charge, by executing vehicle movement within the predetermined time, as described above with reference to FIGS. 6, 8. Accordingly, with this embodiment, external charge can be started according to the use's wishes, even if a trouble occurs to the MID 510, or the like.

In the above-described embodiment, the charge start time of timer-controlled charge is set based on the scheduled departure time, or the like, entered by the user via the MID 510 (manual timer setting). However, the usage status of the vehicle 10, implementation status of external charge, etc. may be learned, and the charge start time of timer-controlled charge may be set, based on the result of learning, without requiring the user to set the time, or the like (automatic timer-controlled charge). Namely, it is possible to start external charge, irrespective of setting of the charge start time of automatic timer-controlled charge, by executing the above-described vehicle movement within a predetermined time before the start time of external charge as automatic timer-controlled charge comes.

Also, in the above-described embodiment, if the operation as shown in FIG. 8 is performed, setting of the charge start time of timer-controlled charge is cancelled, and external charge is started. However, it is possible to start external charge by ignoring setting of timer-controlled charge, rather than cancelling setting of the charge start time of timer-controlled charge.

The embodiment disclosed herein should be considered as being exemplary and not restrictive in all respects. The scope of the present disclosure is indicated or defined by the appended claims, rather than the above description of the embodiment, and is intended to include all changes within the range of the claims and equivalents thereof.

What is claimed is:
1. A vehicle comprising:
 a power receiving device including a power receiving unit, the power receiving unit being configured to contactlessly receive electric power from a power transmitting unit of a power transmission device located outside the vehicle;

a power storage device configured to store electric power received by the power receiving device; and an electronic control unit configured to:

i) set a charge start time at which the power storage device starts being charged;

ii) start charging the power storage device with electric power received by the power receiving device at the charge start time, in a case where (a) the vehicle is kept stopped during a standby period from an adjustment time until the charge start time arrives, the adjustment time being a time at which the vehicle is placed in a condition in which a position of the power receiving unit has been adjusted relative to the power transmitting unit; and iii) start charging the power storage device with electric power received by the power receiving device irrespective of the charge start time, in a case where (b) before the charge start time arrives during the standby period, the vehicle moves from the condition in which the position of the power receiving unit has been adjusted relative to the power transmitting unit, and then (c) the vehicle is brought back into the condition in which the position of the power receiving unit has been adjusted relative to the power transmitting unit, within a predetermined time subsequent to the vehicle having been moved from the condition.

2. The vehicle according to claim 1, wherein the electronic control unit is configured to determine that the vehicle is in the condition in which the position of the power receiving unit has been adjusted relative to the power transmitting unit, by determining that an efficiency of electric power transmission between the power transmitting unit and the power receiving unit is equal to or higher than a predetermined value during a position adjustment operation in which electric power that is equal to or smaller than a predetermined power is transmitted from the power transmitting unit.

3. The vehicle according to claim 1, wherein the electronic control unit is further configured to cancel the charge start time in the case where (b) before the charge start time arrives during the standby period, the vehicle moves from the condition in which the position of the power receiving unit has been adjusted relative to the power transmitting unit, and then (c) the vehicle is brought back into the condition in which the position of the power receiving unit has been adjusted relative to the power transmitting unit, within the predetermined time subsequent to the vehicle having been moved from the condition.

4. The vehicle according to claim 1, wherein the electronic control unit is further configured to determine that the charge start time is not being cancelled in the case where (b) before the charge start time arrives during the standby period, the vehicle moves from the condition in which the position of the power receiving unit has been adjusted relative to the power transmitting unit, and then (d) the vehicle is not brought back into the condition in which the position of the power receiving unit has been adjusted relative to the power transmitting unit, within the predetermined time subsequent to the vehicle having been moved from the condition.

5. A contactless power transfer system comprising:

a vehicle including a power receiving device, a power storage device, and an electronic control unit, the power receiving device including a power receiving unit, the power storage device being configured to store electric power received by the power receiving device;

a power transmission device located outside the vehicle, the power transmission device including a power transmitting unit, the power transmitting unit being configured to contactlessly transmit electric power to the power receiving unit of the power receiving device installed on the vehicle, wherein the power receiving unit of the power receiving device is configured to contactlessly receive electric power from the power transmission device located outside the vehicle, and the electronic control unit is configured to:

i) set a charge start time at which the power storage device starts being charged;

ii) start charging the power storage device with electric power received by the power receiving device at the charge start time, in a case where (a) the vehicle is kept stopped during a standby period from an adjustment time until the charge start time arrives, the adjustment time being a time at which the vehicle is placed in a condition in which a position of the power receiving unit has been adjusted relative to the power transmitting unit; and iii) start charging the power storage device with electric power received by the power receiving device irrespective of the charge start time, in a case where (b) before the charge start time arrives during the standby period, the vehicle moves from the condition in which the position of the power receiving unit has been adjusted relative to the power transmitting unit, and then (c) the vehicle is brought back into the condition in which the position of the power receiving unit has been adjusted relative to the power transmitting unit, within a predetermined time subsequent to the vehicle having been moved from the condition.

6. The contactless power transfer system according to claim 5, wherein the electronic control unit is configured to determine that the vehicle is in the condition in which the position of the power receiving unit has been adjusted relative to the power transmitting unit, by determining that an efficiency of electric power transmission between the power transmitting unit and the power receiving unit is equal to or higher than a predetermined value during a position adjustment operation in which electric power that is equal to or smaller than a predetermined power is transmitted from the power transmitting unit.

7. The contactless power transfer system according to claim 5, wherein the electronic control unit is further configured to cancel the charge start time in the case where (b) before the charge start time arrives during the standby period, the vehicle moves from the condition in which the position of the power receiving unit has been adjusted relative to the power transmitting unit, and then (c) the vehicle is brought back into the condition in which the position of the power receiving unit has been adjusted relative to the power transmitting unit, within the predetermined time subsequent to the vehicle having been moved from the condition.

8. The contactless power transfer system according to claim 5, wherein the electronic control unit is further configured to determine that the charge start time is not being cancelled in the case where (b) before the charge start time arrives during the standby period, the vehicle moves from the condition in which the position of the power receiving unit has been adjusted relative to the power transmitting unit, and then (d) the vehicle is not brought back into the condition in which the position of the power receiving unit has been adjusted relative to the power transmitting unit, within the predetermined time subsequent to the vehicle having been moved from the condition.

* * * * *